United States Patent [19]

Izawa

[11] Patent Number: 4,930,017
[45] Date of Patent: May 29, 1990

[54] COMMUNICATION TERMINAL DEVICE

[75] Inventor: Shoji Izawa, Shizuoka, Japan

[73] Assignee: Tokyo Electric Co., Ltd., Tokyo, Japan

[21] Appl. No.: 256,767

[22] Filed: Oct. 11, 1988

[30] Foreign Application Priority Data

Oct. 19, 1987 [JP] Japan .................. 62-263144

[51] Int. Cl.$^5$ .............................................. H04N 1/32
[52] U.S. Cl. ...................................... 358/296; 346/44; 358/437; 358/468
[58] Field of Search ............... 358/296, 300, 302, 256, 358/468, 437, 401; 346/160, 76 PH, 44

[56] References Cited

U.S. PATENT DOCUMENTS

| | | | |
|---|---|---|---|
| 4,110,794 | 8/1978 | Lester | 358/401 |
| 4,527,885 | 7/1985 | Ayata | 358/468 X |
| 4,630,921 | 12/1986 | Watanabe | 346/76 PH X |
| 4,658,299 | 4/1987 | Tanaka | 358/401 |
| 4,754,335 | 6/1988 | Izawa et al. | |

FOREIGN PATENT DOCUMENTS

62-225064 10/1987 Japan .

Primary Examiner—Joseph W. Hartary
Attorney, Agent, or Firm—Frishauf, Holtz, Goodman & Woodward

[57] ABSTRACT

A communication terminal device includes a network circuit and FAX modem cooperated with each other to receive image information, a printing section for effecting the printing operation with respect to thermosensitive paper, and a processor unit for converting the received image information into the recording format and supplying the converted image information to printing section. The communication terminal device further includes a connector to which a laser printer is connected as an external printer, and an operating section for selectively setting one of the internal and external printer modes, and the processor unit is operated to supply the converted image information to the printer section in the internal printer mode and supply the converted image information to the connector in the external printer mode.

10 Claims, 7 Drawing Sheets

COMMUNICATION TERMINAL DEVICE

BACKGROUND OF THE INVENTION

1. Field of the Invention

This invention relates to a communication terminal device for recording communication information.

2. Description of the Related Art

Facsimile devices are known as communication terminal devices for transferring image information such as characters and image patterns. In the facsimile device, image information is extracted from a received signal and recorded. In general, thermosensitive paper or ordinary paper is used as a recording medium. When ordinary paper is used as the recording medium, it becomes difficult to manufacture the facsimile device simple in construction and at a low cost. For this reason, facsimile devices for printing image information on the thermosensitive recording paper are now most commonly used.

However, unlike the ordinary recording paper, the thermosensitive recording paper is subject to change in quality, and it has a defect that the printed image information will gradually disappear with time. Therefore, it is not preferable to keep the printed thermosensitive recording paper on a file to be stored over a long period of time. In addition, when characters are written on the thermosensitive recording paper, it is difficult to write characters with a pencil, for example, because of the smooth surface of the thermosensitive recording paper.

When a facsimile device is purchased, the size or the price thereof is an important factor for determining the type of the facsimile device if the above defect of the thermosensitive recording paper does not cause any serious problem for actual applications of the facsimile device. Suppose now that a user has purchased a facsimile device for printing image information on thermosensitive recording paper. After this, if it becomes necessary to keep recorded image information over a long period of time, the user will have to think about purchasing a different facsimile device which can print image information on ordinary paper. If the user actually purchases the latter type of facsimile device, more expense will be imposed on the user in comparison with the case where he purchased the latter type facsimile device without purchasing the former type facsimile device at the beginning.

SUMMARY OF THE INVENTION

An object of this invention is to provide an economical communication terminal device in which recording medium for image information can be selectively set.

The object can be attained by a communication terminal device which comprises a communication circuit for receiving image information; an internal printing section for printing a specified recording medium; a connector section; a selecting section for selecting one of first and second modes; and a control circuit for converting the received image information into image information of the recording format, and supplying the image information of the recording format to the internal printing section and the connector section respectively in the first and second mode.

In the communication terminal device, an external recording device which effects the recording operation with respect to recording medium other than the specified recording medium can be connected to the connector section and image information can be transferred to the external recording device via the connector section in the second mode. Thus, since image information can be recorded on recording medium other than the specified recording medium by means of the external recording device, it is not necessary to replace the communication terminal device by a different one according to change of the recording medium. The external recording device is a printing device using ordinary paper as the recording medium, a magnetic disk drive device using a magnetic disk as the recording medium or the like.

DETAILED DESCRIPTION OF THE PREFERRED EMBODIMENTS

Figure 1:
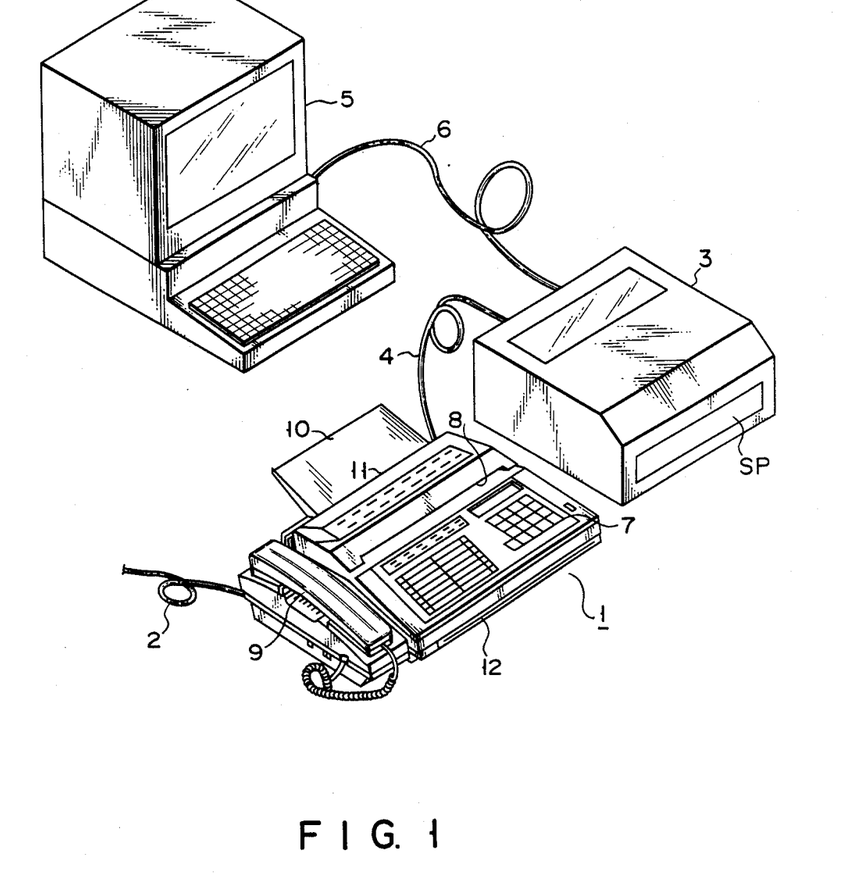
FIG. 1 is a perspective view showing a facsimile device according to one embodiment of this invention.

There will now be described a facsimile device according to one embodiment of this invention with reference to FIGS. 1 to 8C. FIG. 1 shows the external appearance of facsimile device 1. Facsimile device 1 is connected to telephone line 2 and to an external recording device, for example, laser printer 3 via cable 4. Laser printer 3 is also connected to personal computer 5 via cable 6.

Facsimile device 1 includes operating section 7, original document discharging port 8, handset 9, original document inlet guide 10, original document inlet port 11 and recorded paper discharging port 12. Operating section 7 and original document discharging port 8 are provided on the upper surface of a casing, and handset 9 is mounted on the side portion of the casing. Original document inlet guide 10 and original document inlet port 11 are provided on the rear side of the casing, and recorded paper discharging port 12 is provided in the front surface of the casing.

Figure 2:
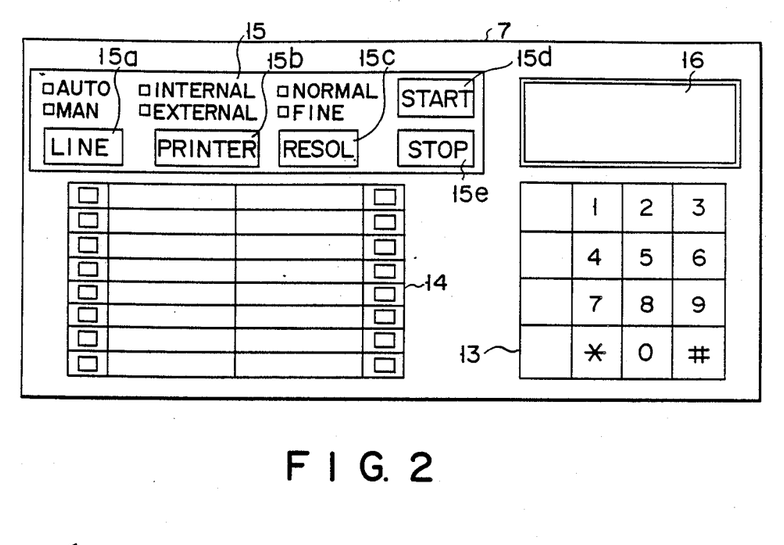
FIG. 2 shows an operating section of the facsimile device shown in FIG. 1.

FIG. 2 shows operating section 7 of facsimile device 1. Operating section 7 includes push type telephone keys 13, one-touch dial keys 14, facsimile keys and liquid crystal display unit 16. Facsimile keys 15 include line selection key 15a for selecting one of "automatic" circuit connection and "manual" circuit connection, printer selection key 15b for selecting one of internal and external printer modes, resolution selection key 15c for selecting one of normal image quality and fine image quality, transmission start key 15d and transmission stop key 15e.

Figure 3:
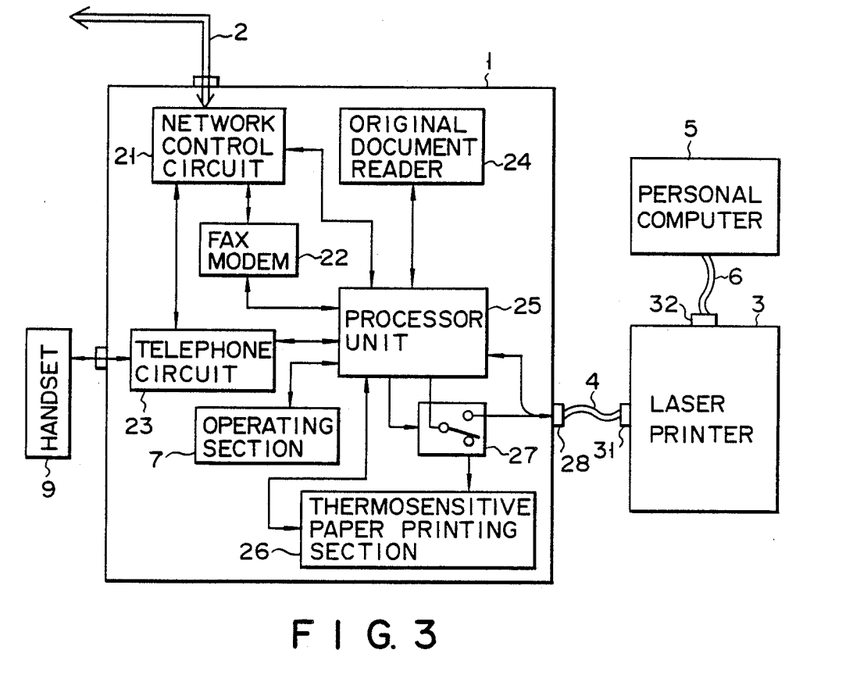
FIG. 3 is a block diagram showing a control circuit of the facsimile device shown in FIG. 1.

FIG. 3 schematically shows a control circuit of facsimile device 1. The control circuit of facsimile device 1 includes network control circuit 21, FAX modem 22, telephone circuit 23, original document reader 24, processor unit 25, thermosensitive paper printing section 26, switching circuit 27 and connector 28. Telephone line 2 is connected network control circuit 21 and handset 9 is connected to telephone circuit 23. Further, network control circuit 21 is connected to telephone circuit 23 and FAX modem 22. Processor unit 25 is connected to operating section 7, network control circuit 21, FAX modem 22, telephone circuit 23, original document reader 24, thermosensitive paper printing section 26, switching circuit 27 and connector 28. Switching circuit 27 is connected to thermosensitive paper printing section 26 and connector 28. Thermosensitive paper printing section 26 is used as the internal recording device of facsimile device 1, and connector 28 is used to connect facsimile device 1 to laser printer 3 via cord 4. Original document reader 24 is used to read image information from the original document inserted into original document inserting port 11. FAX modem 22 is a communication control interface for the facsimile communication, and telephone circuit 23 is a communication control interface for the speech communication. Network control circuit 21 is used to selectively connect one of telephone circuit 23 and FAX modem 22 to telephone line 2, and the operation thereof is controlled by processor unit 25. That is, telephone circuit 23 is connected to telephone line 2 when the speech communication is effected by means of handset 9, and FAX modem 22 is connected to telephone line 2 when the facsimile communication is effected.

In the facsimile transmission, image information is supplied from original document reader 24 to FAX modem 22 via processor unit 25. The image information is converted into the format of facsimile signal in FAX modem 22, and then transmitted to telephone line 2 via network control circuit 21. In the facsimile reception, a facsimile signal is supplied to FAX modem 22 from telephone line 2 via network control circuit 21. FAX modem 22 extracts image information from the received facsimile signal and supplies the same to processor unit 25. In the processor unit 25, the image information is converted into a recording control signal. The recording control signal is supplied to one of thermosensitive paper printing section 26 and connector 28 via switching circuit 27. At this time, the operation of switching circuit 27 is controlled by processor unit 25. For example, when the internal printer is specified by printer selection key 15b, switching circuit 27 is set to permit the recording control signal to be supplied to thermosensitive paper printing section 26. In contrast, when the external printer is specified by printer selection key 15a, switching circuit 27 is set to permit the recording control signal to be supplied to connector 28. Further, the status signal of laser printer 3 is supplied to processor unit 25 via connector 28. If it is detected from the status signal that laser printer 3 is not ready for printing, switching circuit 27 causes the recording control signal to be supplied to thermosensitive paper printing section 26.

When the recording control signal is supplied to thermosensitive paper printing section 26, thermosensitive paper printing section 26 prints the image information on thermosensitive paper used as the recording medium.

Figure 4:
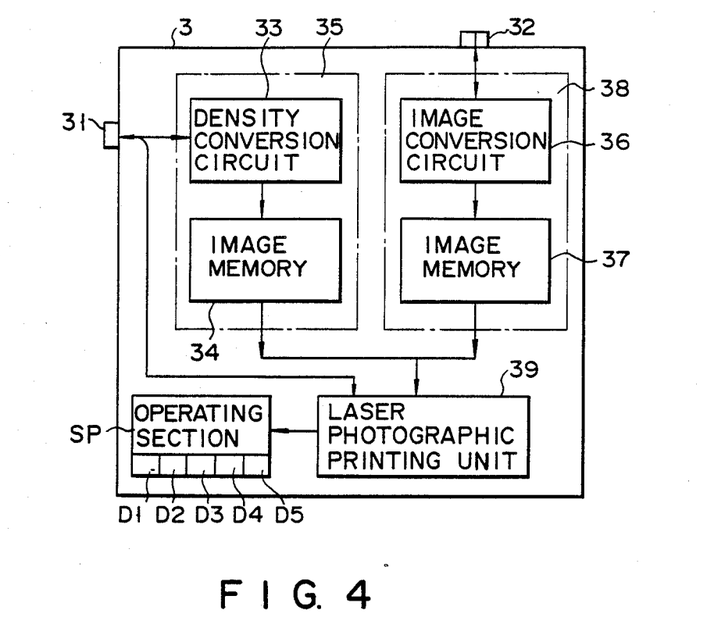
FIG. 4 is a block diagram showing the circuit of a laser printer connected to the facsimile device shown in FIG. 1.

FIG. 4 schematically shows the control circuit of laser printer 3. Laser printer 3 includes connectors 31 and 32, facsimile interface 35, computer interface 38, laser photographic printing unit 39 and operating section 40. Connector 31 is used for connection with facsimile device 1 via cable 4, and connector 32 is used for connection with personal computer 5 via cable 6. Facsimile interface 35 includes density converting circuit 33 connected to connector 31 and image memory 34 connected to density converting circuit 33. Computer interface 38 includes image converting circuit 36 connected to connector 32 and image memory 37 connected to image converting circuit 36. Further, laser photographic printing unit 39 is connected to connector 32, image memories 34 and 37, and operating section 40.

The recording control signal from facsimile device 1 is supplied to density converting circuit 33 via connector 31. In general, the facsimile image density is 8 lines/mm (in a horizontal direction)×3.85 or 7.7 lines/mm (in a vertical direction), for example. In contrast, the printing density of the laser printer is 300 dots/inch (in a horizontal direction)×300 dots/inch (in a vertical direction). Density converting circuit 33 performs density conversion process so as to convert the density of image information included in the recording control signal in conformity with the printing density of laser printer 3. Image memory 34 is a buffer for temporarily storing image information supplied from density converting circuit 33, and is provided to compensate for a difference between the low printing speed of laser photographic printing unit 39 and the signal receiving speed of the facsimile signal. Image converting circuit 36 converts character code or ASCII code supplied from computer 5 into image information. Image memory 37 is a buffer for temporarily storing image information supplied from image converting circuit 36, and is provided to compensate for a difference between the low printing speed of laser photographic printing unit 39 and the supplying speed of the character code.

Laser photographic printing unit 39 reads out image information from one of image memories 34 and 37, and prints the readout image information on ordinary paper used as the recording paper. While laser printer 3 is used as an external printing device, laser photographic printing unit 39 reads out image information from image memory 34 in preference to image memory 37.

Figure 5:
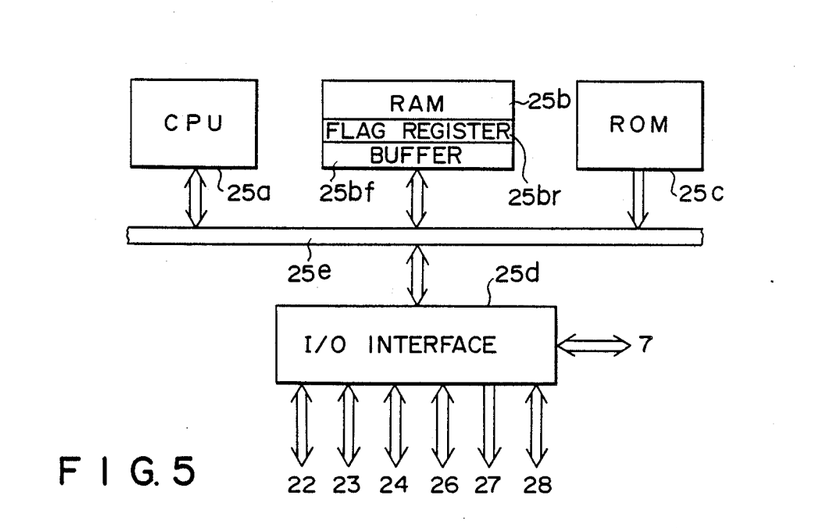
FIG. 5 shows in detail the construction of a processor unit shown in FIG. 3.

FIG. 5 shows processor unit 25 more in detail. Processor unit 25 includes CPU 25a, RAM 25b, ROM 25c, I/0 interface 25d and bus line 25e. CPU 25a, RAM 25b, ROM 25c and I/0 interface 25d are connected to each other via bus line 25e. ROM 25c is used to store the control program for CPU 25a, and RAM 25b is used for temporarily storing input and output data of CPU 25a. RAM 25b includes buffer area 25bf for storing image information necessary for the printing operation of thermosensitive paper printing section 26 or laser printer 3 for ordinary paper and flag register area 25br for storing various flags including a flag for specifying one of the internal and external printers selected by operating printer selection key 15b, for example. I/0 interface 25d is used for the data transfer between CPU 25a and each of operation section 7, FAX modem 22, telephone circuit 23, original document reader 24, thermosensitive printing section 26, switching circuit 27 and connector 28.

Figure 6:
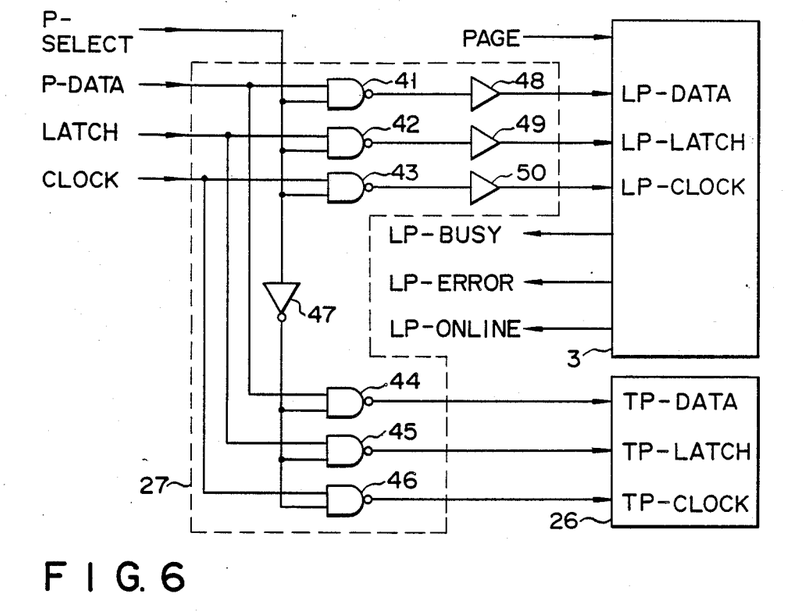
FIG. 6 shows in detail the construction of a switching circuit shown in FIG. 3.
Figure 7:
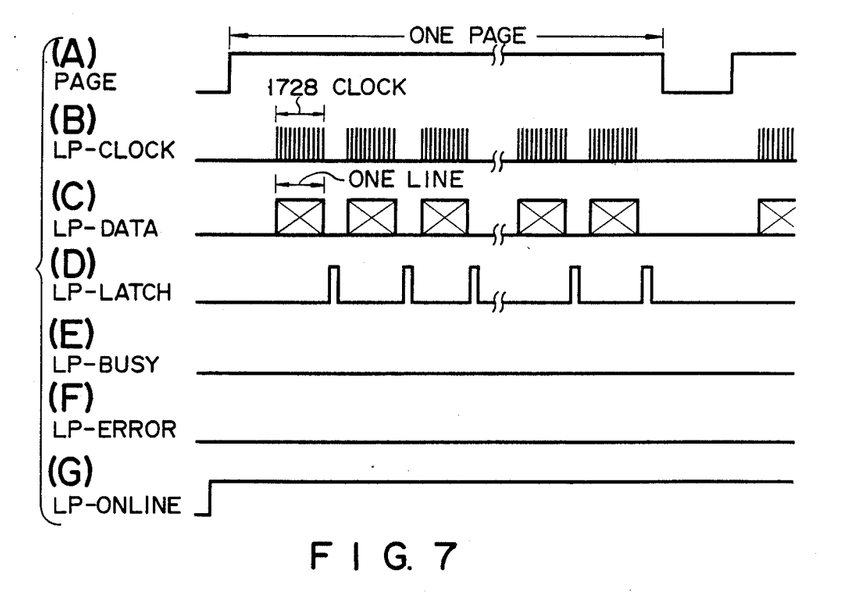
FIGS. 7A to 7G are timing charts of signals transmitted via a connector shown in FIG. 3.

FIG. 6 shows the construction of switching circuit 27 in more detail. Switching circuit 27 includes two-input NAND gates 41 to 46, inverter 47, and drivers 48 to 50. The first input terminals of NAND gates 41 to 43 are connected to receive printer selection signal P-SELECT which is supplied from processor unit 25 to select one of the internal and external printer modes, and the first input terminals of NAND gates 44 to 46 are connected to receive printer selection signal P-SELECT via inverter 47. The second input terminals of NAND gates 41 and 44 are each connected to receive image information as dot print data P-DATA in the serial format from processor unit 25. The second input terminals of NAND gates 42 and 45 are each connected to receive latch signal LATCH which is supplied from processor unit 25 to latch dot print data P-DATA of one line. The second input terminals of NAND gates 43 and 46 are each connected to receive synchronizing clock signal CLOCK from processor unit 25. Output signals of NAND gates 41 to 43 are supplied to drivers 48 to 50 which in turn supply output signals to laser printer 3 connected to connector 28. Output signals of NAND gates 44 to 46 are supplied to thermosensitive paper printing section 26. That is, dot print data P-DATA, latch signal LATCH and synchronization clock signal CLOCK are supplied as external print data LP-DATA, external latch signal LP-LATCH and external synchronization clock signal LP-CLOCK from NAND gates 41 to 43 when the external printer is selected by printer selection signal P-SELECT, and supplied as internal print data TP-DATA, internal latch signal TP-LATCH and internal synchronization clock signal TP-CLOCK from NAND gates 44 to 46 when the internal printer is selected by printer selection signal P-SELECT.

Processor unit 25 generates page control signal PAGE indicting the start and end of supply of print data of one page. Page control signal PAGE is supplied from processor unit 25 directly to laser printer 3 connected to connector 28. Laser printer 3 supplies busy signal LP-BUSY, error signal LP-ERROR and on-line signal LP-ONLINE as status signals to processor unit 25 via connector 28.

FIGS. 7(A) to 7(G) are timing charts of signals transmitted via connector 28. Page control signal PAGE is shown in FIG. 7(A). Laser printer 3 is set ready for input reception in response to the rise of page control signal PAGE, and terminates the input reception and starts the printing operation in response to the fall of page control signal PAGE. External synchronization clock signal LP-CLOCK is shown in FIG. 7(B) and external print data LP-DATA is shown in FIG. 7(C). External synchronization clock signal LP-CLOCK includes 1728 clock pulses as synchronization clock pulses for serial dot print data of one line indicated by each block in FIG. 7(C). External latch signal LP-LATCH is shown in FIG. 7(D). External latch signal LP-LATCH includes a pulse generated each time the transfer of serial dot print data of one line is completed. In laser printer 3, serial print data of one line is subjected to the density conversion process in response to each pulse in the external latch signal and then stored into image memory 34. Busy signal LP-BUSY is shown in FIG. 7(E). Busy signal LP-BUSY is set to an "H" level when, for example, no available storage area is detected in the reception buffer and laser printer 3 cannot continue to receive serial print data. If laser printer 3 is set in a condition in which data can be received, busy signal LP-BUSY is set to an "L" level as shown in FIG. 7(E). Error signal LP-ERROR is shown in FIG. 7(F). Error signal LP-ERROR is set to "H" level when, for example, an abnormal condition such as no recording paper, a jam of paper, no toner and inadequate operation temperature of the fixing device is detected and the printing operation cannot be effected. In contrast, when the printing operation can be effected, Error signal LP-ERROR is set to "L" level as shown in FIG. 7(F). On-line signal LP-ONLINE is also shown in FIG. 7(F). As shown in FIG. 7(F), on-line signal LP-ONLINE is set to "H" level when laser printer 3 is connected to connector 28 and the power source is turned on. In a case where laser printer 3 is not connected to connector 28 or the power source of laser printer 3 is turned off, on-line signal LP-ONLINE is set to "L" level.

In operating section SP of laser printer 3, lamp sections D1 to D4 are activated when no recording paper, a jam of recording paper, no toner and an inadequate operation temperature of the fixing device are detected, respectively. Further, lamp section D5 is activated when the power source of laser printer 3 is turned on.

In operating section 7 of facsimile device 1, liquid crystal display unit 16 displays a message of "EXTERNAL PRINTER NOT READY" when it is detected that busy signal LP-BUSY, error signal LP-ERROR and on-line signal LP-ONLINE are not set to "L", "L" and "H" levels, respectively.

Like the status signal of laser printer 3, the status signal of thermosensitive paper printing section 26 is directly supplied to processor unit 25 which in turn detects the absence of recording paper and jam of paper in thermosensitive paper printing section 26 based on the status signal.

Figure 8A:
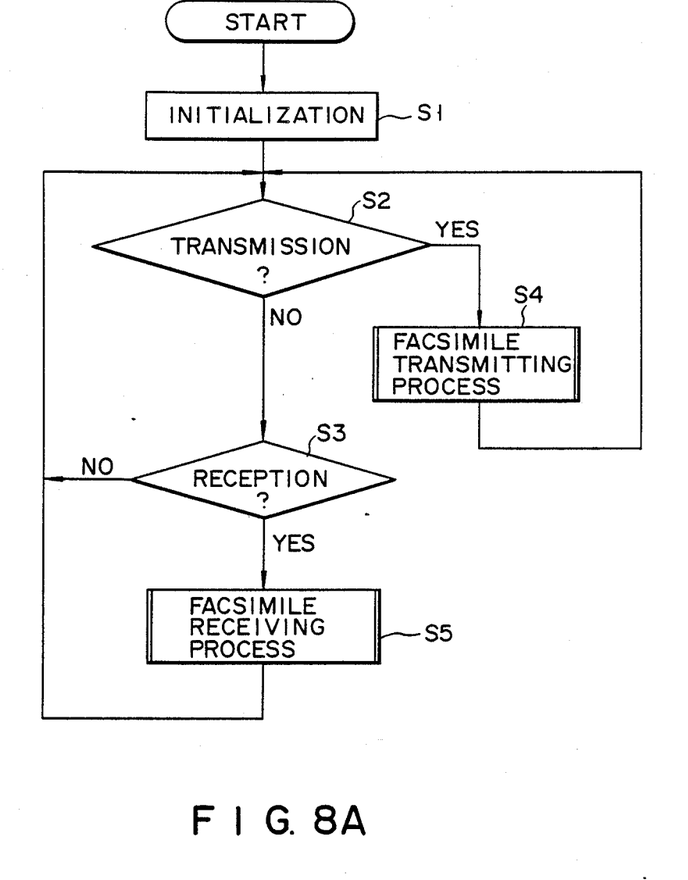
FIGS. 8A to 8C are flowcharts showing the operation of the processor unit shown in FIG. 3.
Figure 8B:
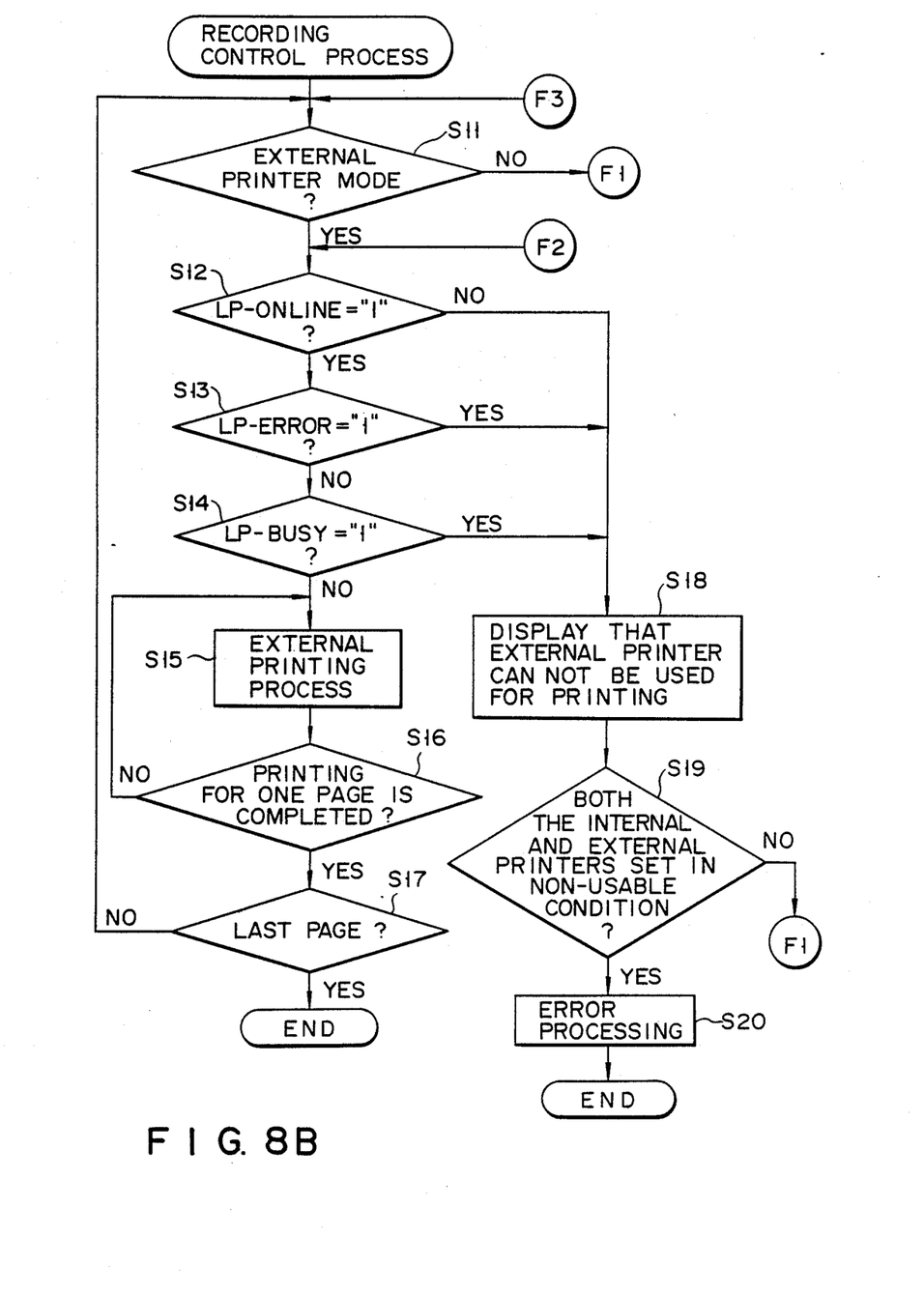
Figure 8C:
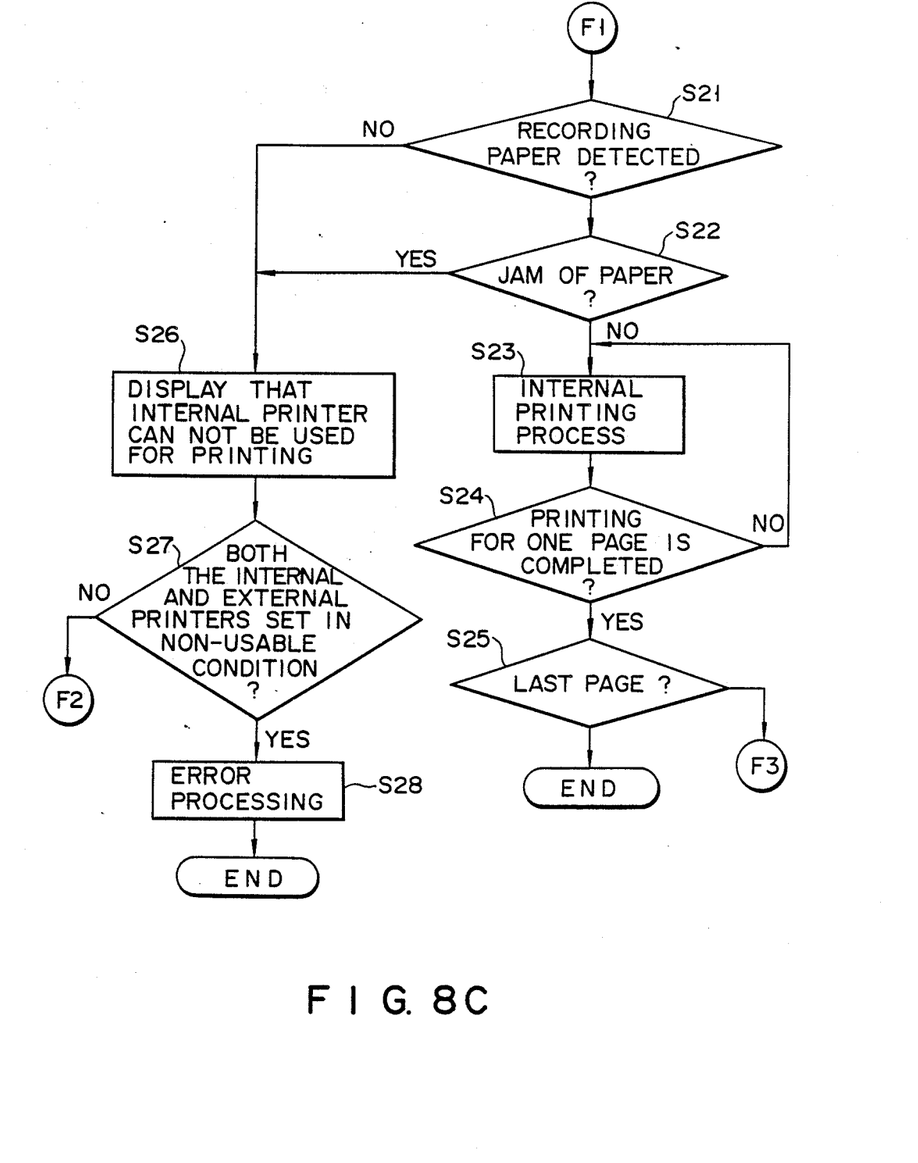

Now, the control operation of the facsimile communication is explained with reference to FIGS. 8A to 8C. FIGS. 8A to 8C are flow charts showing the operation of processor unit 25. The communication control operation is effected by reading out the control program from ROM 25c and executing the control program by means of CPU 25a. When the control program is initiated in the flowchart shown in FIG. 8A, the control circuit is initialized in step S1, and it is checked in steps S2 and S3 whether transmission and reception commands are received or not. When neither of the commands are received, steps S2 and S3 are repeatedly effected. If the transmission command is detected in step S2, the facsimile transmitting operation is effected in step S4. In the facsimile transmitting operation, processor unit 25 causes original document reader 24 to read image information from the original document, causes FAX modem 22 to convert the image information into a corresponding facsimile signal, and controls network control circuit 21 so as to transmit the facsimile signal to telephone line 2. When it is detected in step S3 that the reception command is received, the receiving operation is effected in step S5. In the facsimile receiving operation, processor unit 25 controls network control circuit 21 so as to supply the facsimile signal from telephone line 2 to FAX modem 22, and causes FAX modem 22 to extract image information from the facsimile signal. Further, processor unit 25 performs recording control process for the image information in the facsimile receiving operation.

The flowchart of the recording control process is shown in FIGS. 8B and 8C. In the recording control process, the printer flag in flag register 25br is checked in step S11. If it is detected in step S11 that the external printer mode is set, it is checked in steps S12, S13 and S14 whether the external printer or laser printer 3 can be used or not. Step S15 is effected when it is detected in steps S12, S13 and S14 that the power source of the external printer is turned on, the external printer is not in the error condition, and the external printer is not in the busy condition, respectively. In step S15, printer select signal P-SELECT is raised and the image information is supplied as a recording control signal from processor unit 25 to laser printer 3 via switching circuit 27. After this, laser printer 3 prints the image information on the ordinary paper. The printing operation of laser printer 3 is kept effected until the image information of one page is printed. When it is detected in step S16 that the printing operation of the image information of one page is completed, it is checked in step S17 whether the last page is printed or not. If it is detected in step S17 that the last page is not printed, step S11 is effected again. In contrast, if it is detected in step S17 that the last page is printed, step S2 is effected again.

Step S18 is effected when it is detected in one of steps S12 to S14 that the external printer cannot be used. In step S18, a message is displayed on display unit 16 to inform that the external printer cannot be used. After this, it is checked in step S19 whether or not the internal printer or thermosensitive paper printing section 26 and the external printer are both set in the non-usable condition. If it is detected that both the printers are in the non-usable condition, an error processing for inhibiting the use of the external printer is effected in step S20 and thus the recording control process is completed.

If it is detected in step S19 that neither of the internal and external printers are set in the non-usable condition, or if it is detected in step S11 that the internal printer mode is set, it is checked in steps S21 and S23 whether thermosensitive paper printing section 26 can be used or not. Step S23 is effected when the presence of recording paper is detected in step S21 and no jam of paper is detected in step S22. In step S23, printer select signal P-SELECT is lowered and image information is supplied as a recording control signal from processor unit 25 to thermosensitive paper printing section 26 via switching circuit 27. After this, printing section 26 prints the image information on thermosensitive paper. The printing operation of printing section 26 is continued until image information of one page is completely printed. If it is detected in step S24 that the printing operation of image information of one page is completed, it is checked in step S25 whether the printing operation of the last page is completed or not. If it is detected in step S25 that the last page is not printed, step S11 is effected again. In contrast, if it is detected in step S25 that the last page is printed, step S2 is effected again.

Step S26 is effected when it is detected in one of steps S21 and S22 that the internal printer cannot be used. In step S26, a message is displayed on display unit 16 to inform that the internal printer is not ready for printing. After this, it is checked in step S27 whether or not the internal and external printers are both set in the non-usable condition. If it is detected that both the printers are in the non-usable condition, an error processing for inhibiting the use of the internal printer is effected in step S28 and then the recording control process is completed. In contrast, if both the printers are not set in the non-usable condition, step S12 is effected.

In the above embodiment of this invention, in a case where it is sufficient only if image information can be printed on thermosensitive paper, it is required to purchase only facsimile device 1, and therefore it does not cost much. After this, if it becomes necessary to record the received image information on ordinary paper, it is only required to purchase laser printer 3 and connect laser printer 3 to connector 28 of facsimile device 1 via cable 4. In this way, it is possible to purchase laser printer 3 later when required, and it is economically advantageous in comparison with the case wherein two different types of facsimile devices are purchased.

With laser printer 3 connected, internal thermosensitive paper printing section 26 or external laser printer 3 can be selectively used by operating printer select key 15b. Therefore, when it is required to record and store the received image information over a long period of time, laser printer 3 can be operated to record the image information on ordinary paper, and when it is not required to store the recorded image information over a long period of time, thermosensitive paper printing section 26 may be operated to record the image information on thermosensitive paper.

In this way, it is possible to selectively record the received image information on normal paper or thermosensitive paper as required, and the versatility of facsimile device 1 can be increased.

Further, with the external printer connected, even if a selected one of the printers becomes defective and cannot effect the printing operation for some reason, the other printer is automatically selected to effect the printing operation. Therefore, the received image information can be reliably recorded, increasing the reliability of the facsimile device.

Since laser printer 3 can be connected not only to facsimile device 1 but also to personal computer 5, laser printer 3 can be effectively used, thus further attaining the economical advantage.

In the above embodiment, laser printer 3 is used as an external recording device, but it is not limited to this. For example, heat-transfer recording type, electrostatic photographic recording type or LED photographic recording type printers can also be used.

Further, the external recording device is not limited to a device using normal paper but a device using a different type of paper can be used as the external recording device. In this case, the external recording device can be of the same type as the internal recording device using thermosensitive paper. Since the external recording device can be arranged in position different from that of the internal recording device, the versatility of the facsimile device can be further increased.

If the internal recording device provided in the facsimile device is a device using normal paper, a thermosensitive paper printing device can be used as the external recording device. In this case, the same effect as that in the above embodiment can be attained.

Further, laser printer 3 can be replaced by a recording device using recording medium such as a magnetic floppy disk.

As described above, according to this invention, there is provided a facsimile device in which the external recording device can be used in addition to the internal recording device. Thus, the internal and external recording devices can be selectively used, increasing the versatility and economical efficiency of the facsimile device.

What is claimed is:

1. A communication terminal device comprising:
a communication circuit for receiving information;
a built-in recording device for recording the received information on a specified recording medium;
a connector section to which an optional recording device is selectively connected;
selection means for selecting one of said recording devices;

control means connected to receive the information supplied from said communication circuit, for supplying the information to the recording device selected by said selection means; and wherein said control means includes processing means for repeatedly checking the selected recording device, and for causing the information to be supplied to the other recording device when it is detected that the selected recording device is not accessible.

2. A communication terminal according to claim 1, wherein:

said control means includes switching means for selectively transferring the information to either the built-in or optional recording device; and said processing means includes a processing circuit means for repeatedly checking the selected recording device, and for permitting said switching means to transfer the information to the selected recording device when it is detected that the selected recording device is accessible, and to transfer the information to the other recording device when it is detected that the selected recording device is not accessible.

3. A communication terminal device according to claim 2, wherein said processing circuit further includes means for inhibiting the information from being supplied to the built-in and optional recording devices when the other of said recording devices is not accessible in addition to the selected recording device.

4. A communication terminal device according to claim 3, wherein said processing means further comprises means for determining that the optional recording device is not accessible when detecting that the optional recording device is not connected to said connector section; that the power source of said optional recording device is not turned on; that said optional recording device is set in an abnormal condition; or that said optional recording device cannot continue to receive the information.

5. A communication terminal device according to claim 4, wherein said optional recording device is of the type in which the information is recorded on a recording medium other than said specified recording medium.

6. A communication terminal device according to claim 11, wherein said processing means further comprises means for determining that the optional recording device is not accessible when detecting that the optional recording device is not connected to said connector section; that the power source of said optional recording device is not turned on; that said optional recording device is set in an abnormal condition; or that said optional recording device cannot continue to receive the information.

7. A communication terminal device according to claim 1, wherein said optional recording device is of the type in which the information is recorded on a recording medium other than said specified recording medium.

8. A facsimile device comprising:

a communication circuit for receiving image information;

a built-in printing device for printing the received image information on thermosensitive paper;

a connector section to which an optional printing device is selectively connected;

selection means for selecting one of said printing devices; and control means connected to receive the image information supplied from said communication circuit, for supplying the image information to the recording device selected by said selection means; and wherein said control means includes processing means for converting the image information into a printing format, and for repeatedly checking the selected printing device, and for causing the image information to be supplied to the unselected printing device when it is detected that the selected printing device is not accessible.

9. A facsimile device according to claim 8, wherein said optional printing device is of the type in which the image information is printed on ordinary paper.

10. A facsimile device according to claim 8, wherein said processing means includes means for checking the selected printing device each time image information for one page is printed.

* * * * *